(12) United States Patent
Kodani et al.

(10) Patent No.: US 7,012,201 B2
(45) Date of Patent: Mar. 14, 2006

(54) ROTARY ENCODER

(75) Inventors: Takashi Kodani, Tsuyama (JP);
Takashi Tomago, Tsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/055,326

(22) Filed: Feb. 10, 2005

(65) Prior Publication Data
US 2005/0189203 A1     Sep. 1, 2005

(30) Foreign Application Priority Data
Feb. 26, 2004   (JP) ............................. 2004-051086

(51) Int. Cl.
*H03M 11/00*     (2006.01)
*G01D 5/34*      (2006.01)

(52) U.S. Cl. ..................... 200/14; 250/231.14; 341/20; 345/163; 345/165; 345/166

(58) Field of Classification Search ........ 345/163–167, 345/157; 341/20; 250/231.18, 231.17, 231.14, 250/231.13, 220, 229; 200/4, 11 R–11 TW, 200/17 R, 18
See application file for complete search history.

(56) References Cited

U.S. PATENT DOCUMENTS

| | | | | |
|---|---|---|---|---|
| 5,070,238 A | * | 12/1991 | Ishihara et al. | 250/231.13 |
| 5,569,912 A | * | 10/1996 | Turk et al. | 250/231.14 |
| 5,828,060 A | * | 10/1998 | Juniman | 250/231.13 |
| 6,292,113 B1 | * | 9/2001 | Wu | 341/20 |
| 6,344,643 B1 | * | 2/2002 | Chen | 250/221 |
| 6,350,984 B1 | * | 2/2002 | Senda | 250/231.13 |
| 6,388,212 B1 | | 5/2002 | Ishihara et al. | |
| 6,555,768 B1 | * | 4/2003 | Deruginsky et al. | 200/4 |
| 6,930,259 B1 | * | 8/2005 | Jorgensen et al. | 200/4 |

FOREIGN PATENT DOCUMENTS

JP    2001-084877    3/2001

* cited by examiner

*Primary Examiner*—Michael A. Friedhofer
(74) *Attorney, Agent, or Firm*—RatnerPrestia

(57) ABSTRACT

A rotary encoder includes a roller having substantially cylindrical shape, an inner shaft, a translucent cylindrical light guide shaft, a pair of holders, a light-emitting device, and a light-detecting device. The inner shaft is inserted and secured to a center hole of the roller, and has a slit at one end along a direction parallel to the axis thereof. The light guide shaft is inserted in the inner shaft so that one end of it is surrounded by the slit, and this guide has a first and second planes, and a first and second inclined planes. The first and second planes are formed on a lower side at both ends of the light guide shaft in parallel to the axis of the shaft. The first and second inclined planes are formed above the first and second planes at an angle of 45 degrees to the axis of the shaft, so that the two planes are substantially orthogonal to each other.

7 Claims, 14 Drawing Sheets

ROTARY ENCODER

BACKGROUND OF THE INVENTION

1. Field of the Invention

The present invention relates to a rotary encoder operated by rotary manipulation of an outer periphery thereof.

2. Background Art

In any of portable terminals, IT-related apparatuses and vehicle-mounted control apparatuses, there is a tendency in recent years that an operating panel has a single device for centralized manipulation, and a demand thus exists in the market for a prolonged service life of such operating devices.

Referring to FIG. 15 through FIG. 17, description is provided of a rotary encoder (hereinafter referred to as "encoder") as an example of such conventional operating devices.

FIG. 15 is a sectional view of a conventional encoder. FIG. 16 is an exterior view of the encoder shown in FIG. 15. FIG. 17 is an exploded perspective view of the encoder shown in FIG. 15.

In FIG. 15 through FIG. 17, substrate 1 made of an insulating resin is provided with a pair of confronting supports 2 (hereinafter referred to as "supports 2") at a fringe of it. Quadrangular frame 3 is pivotally supported by supports 2 to substrate 1. Rotary body 4 is retained in a rotatable manner to frame 3. Rotary body 4 has large cylindrical shaped knob 5 at its center portion. Knob 5 has a hollow and is made of a resin. And, rotary body 4 has cylindrical shafts 6A and 6B (hereinafter "shafts 6A and 6B") of a small diameter at both ends of it. Shaft 6A is provided with movable contact 7 (hereinafter referred to as "contact 7") on its outer periphery, and shaft 6B is provided with undulated surface 8 also on its outer periphery. In other words, cylindrical shaft 6 (hereinafter referred to as "shaft 6") of the small diameter provided with contact 7 and undulated surface 8 near the both ends of it is inserted in and fixed to center hole 5A of knob 5, to constitute rotary body 4. Contact 7 has cylindrical contact portion 7A (hereinafter referred to as "contact portion 7A") and comb-tooth contact portion 7B (hereinafter referred to as "contact portion 7B").

Three flexible stationary contacts 9A, 9B and 9C (hereinafter referred to as "contacts 9A, 9B and 9C") secured to substrate 1 are in contact resiliently with contact 7. Plate spring 10 extended from substrate 1 is also in resilient contact with undulated surface 8.

In addition, self-resettable type push switch 11 is disposed to substrate 1 in a manner to be operated when depressed by a turning movement of frame 3. Cover 12 is then placed to enclose both ends of rotary body 4, to complete the rotary encoder.

Frame 3 has four sides 14A, 14B, 15A and 15B. Side 14A is provided with pivot shafts 13 (hereinafter referred to as "pivots 13"). Sides 14A and 14B are arranged opposite to each other. Two opposite sides 15A and 15B are in continuity to sides 14A and 14B respectively at right angles.

Pivots 13 are inserted in support holes 2A formed in supports 2, frame 3 is pivotally supported to substrate 1. In addition, projections 16A and 16B formed at both ends of side 14B are inserted in restraining holes 17A and 17B to limit a range of pivoting angle of frame 3. Restraining holes 17A and 17B are provided on substrate 1 at a side opposite supports 2.

U-shaped retaining slots 18A and 18B, each having a narrowly cutout opening at the upper side, are formed in generally the center of respective sides 15A and 15B. Shafts 6A and 6B are pressed from the upper side to fit into retaining slots 18A and 18B to ratably hold shaft 6.

In the structure described above, shaft 6 rotates and the rotary encoder operates when a force is applied to knob 5 in a direction tangent to its outer periphery.

That is, as rotary body 4 rotates, contacts 9A, 9B and 9C slide on contact portions 7A and 7B while maintaining resilient contact with them. This produces electrical signals between connection terminals 9D and 9E, and between connection terminals 9D and 9F as these terminals 9D, 9E and 9F are electrically in continuity to contacts 9A, 9B and 9C respectively.

At the same time, detent 10A formed on flexible plate spring 10 slides over undulated surface 8 while maintaining resilient contact to it. This produces tactile responses corresponding to the electrical signals. Detent 10A is then caught in one of slits in undulated surface 8 when rotary body 4 stops rotation.

When a depressing force is applied downward to knob 5, frame 3 turns at pivots 13. This causes depressing boss 14C formed on the underside at side 14B to depress and actuate push switch 11.

The above example of the prior art is disclosed in Japanese Patent Unexamined Publication, No. 2001-084877, for instance.

In the conventional rotary encoder, however, contacts 9A, 9B and 9C slide on contact portions 7A and 7B while maintaining resilient contact at all the time. As a result, contacts 9A, 9B and 9C and contact portions 7A and 7B wear out at their contacting points due to the rotating operations, which makes it difficult to prolong the service life.

SUMMARY OF THE INVENTION

A rotary encoder of the present invention includes a roller having substantially cylindrical shape, a tubular inner shaft, a translucent cylindrical light guide shaft, a pair of holders, a light-emitting device, and a light-detecting device. The roller has a center hole. The inner shaft is inserted in and connected to the center hole, and it has a slit formed at one end along a direction parallel to the axis of the inner shaft. The light guide shaft has a first plane, a second plane, a first inclined plane and a second inclined plane, and it is inserted in the inner shaft in a manner that one end of it is surrounded by the slit. The first plane is formed on a lower side at one end of the light guide shaft in parallel to the axis of the light guide shaft. The second plane is formed on a lower side at the other end of the light guide shaft in parallel to the axis of the light guide shaft. The first inclined plane is formed above the first plane at an angle of 45 degrees to the axis of the light guide shaft. The second inclined plane is formed above the second plane at an angle of 45 degrees to the axis of the light guide shaft, that is substantially orthogonal to the first inclined plane. The pair of holders supports the roller in a rotatable manner by means of the inner shaft, while also holding securely one end of the light guide shaft. The light-detecting device is disposed under one end of the light guide shaft. The light-emitting device is disposed under the other end of the light guide shaft. A light emitted by the light-emitting device enters the light guide shaft at the first plane, it is reflected off the first inclined plane and the second inclined plane, led to an outside of the light guide shaft through the second plane, and detected by the light-detecting device when it passes through the slit. According to this structure, the light-detecting device can output a pulse signal when it receives the light through the slit without even requiring a sliding contact. The invention can thus achieve the rotary encoder of a long life and small dimensions.

DETAILED DESCRIPTION OF THE INVENTION

First Embodiment

Figure 1:
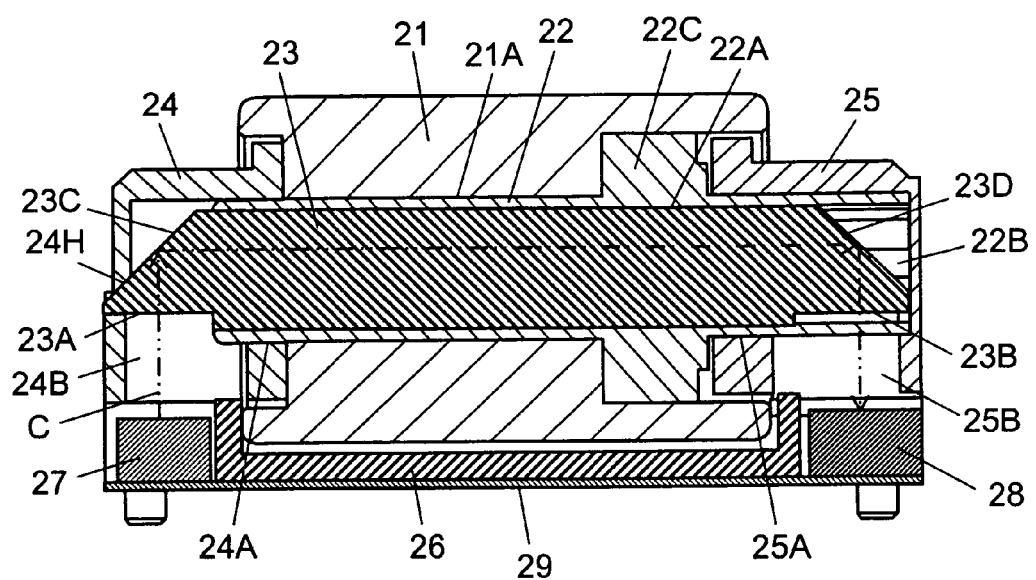
FIG. 1 is a sectional view of a rotary encoder according to a first embodiment of the present invention.
Figure 2:
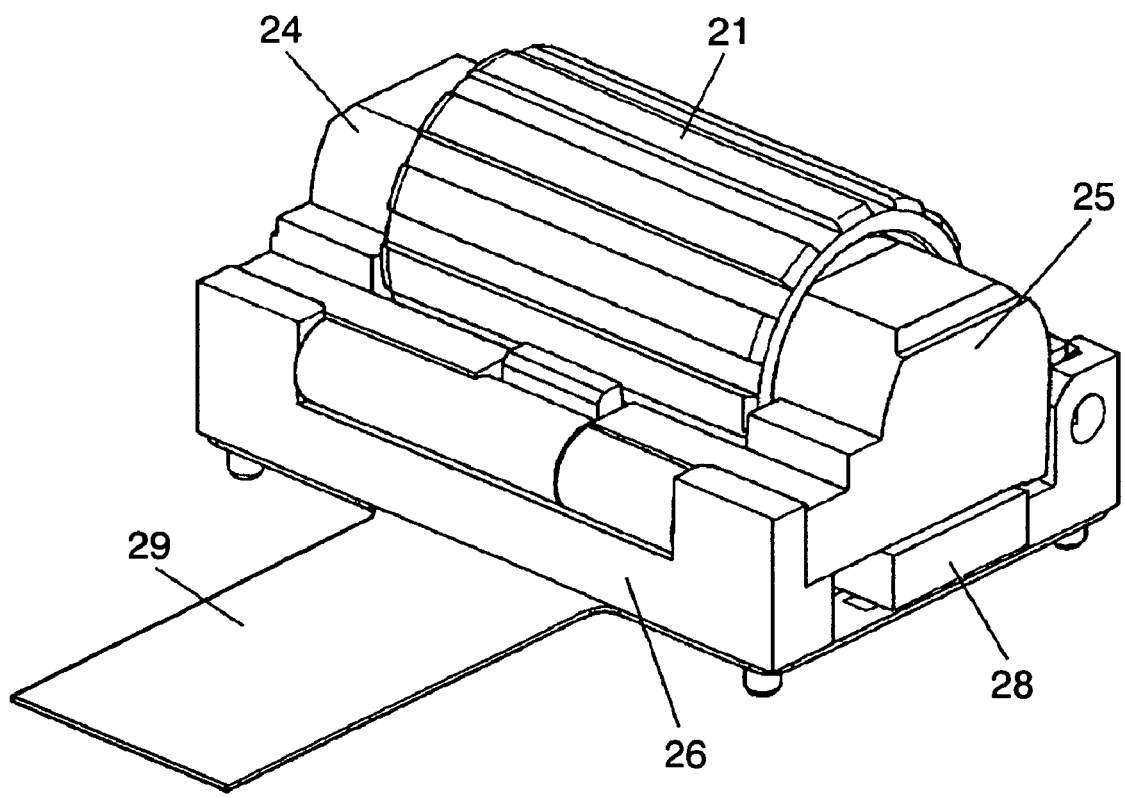
FIG. 2 is a general exterior view of the rotary encoder shown in FIG. 1.
Figure 3:
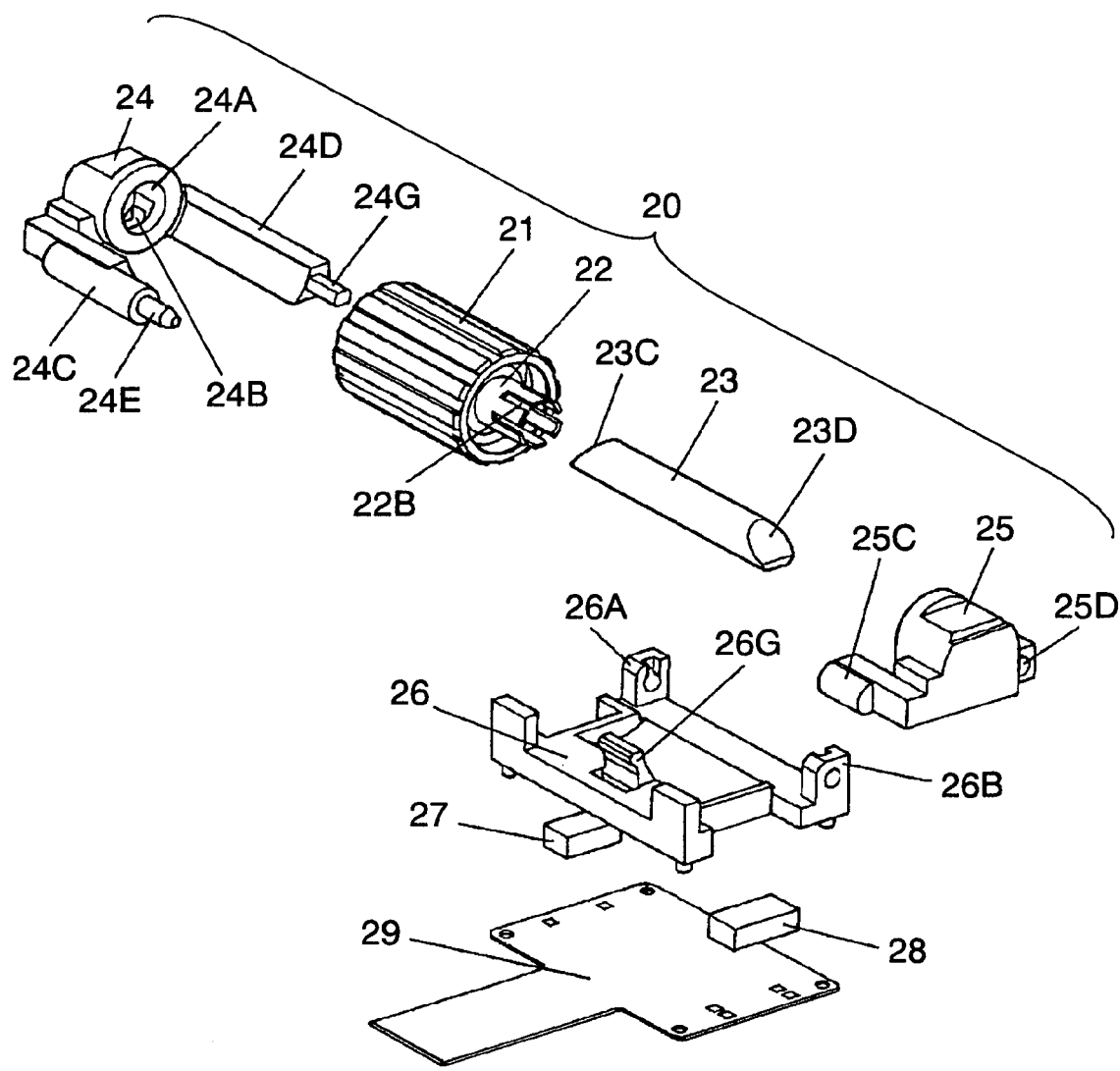
FIG. 3 is an exploded perspective view of the rotary encoder shown in FIG. 1.

FIG. 1 is a sectional view of a rotary encoder (hereinafter referred to as "encoder") according to the first embodiment. FIG. 2 is a general exterior view of the encoder shown in FIG. 1. FIG. 3 is an exploded perspective view of the encoder shown in FIG. 1.

In FIG. 1 through FIG. 3, roller 21 made of an insulating resin has a substantially cylindrical configuration with ridges and ditches formed throughout its outer surface as means to prevent slipping. Center hole 21A is so formed in roller 21 that both ends have a larger diameter. Inner shaft 22 (hereinafter referred to as "shaft 22") also made of an insulation resin is inserted in center hole 21A, and fixed to roller 21. Shaft 22 is provided with through hole 22A having a circular shape in cross section. Cylindrically-shaped translucent light guide shaft 23 (hereinafter referred to as "shaft 23") made of a transparent material such as polycarbonate, glass and the like is inserted in through hole 22A.

First holder 24 (hereinafter referred to as "holder 24") at the left side and second holder 25 (hereinafter referred to as "holder 25") at the right side compose a holder pair to support shaft 22 in a freely rotatable manner from the both ends. In addition, holder 24 securely retains the left end of shaft 23. A combination of roller 21, shafts 22 and 23, and holders 24 and 25 compose one sub-assembly component block 20 (hereinafter referred to as "block 20").

Mount 26 of generally a square shape supports block 20. Furthermore, mount 26 is bonded to mounting substrate 29 (hereinafter referred to as "substrate 29") on its underside face with adhesive or the like means. Substrate 29 is formed by a flexible wiring board.

Light-emitting device 27 having a single element of light-emitting diode or the like is disposed to an upper surface of substrate 29 by such fixing means as soldering. Light-detecting device 28 having a combination of two phototransistors or the like elements is also disposed to the upper surface of substrate 29 by soldering or the like fixing means.

Shaft 23 has first plane 23A (hereinafter referred to as "plane 23A") and second plane 23B (hereinafter referred to as "plane 23B") formed in parallel to the axis of shaft 23 on the underside at respective ends of it. Light-emitting device 27 faces plane 23A at the left side of shaft 23, and light-detecting device 28 faces plane 23B at the right side of shaft 23. Both of planes 23A and 23B are in parallel to the axis of shaft 23, and they are also substantially in parallel with respect to each other.

In addition, shaft 23 has first inclined plane 23C (hereinafter referred to as "plane 23C") and second inclined plane 23D (hereinafter referred to as "plane 23D") formed on the upper side at the ends of it in a manner to confront planes 23A and 23B respectively at an angle of 45 degrees. Planes 23C and 23D are therefore substantially orthogonal with respect to each other.

Shaft 22 is retained rotatably in guide holes 24A and 25A in respective holders 24 and 25. Shaft 22 is provided with a plurality of slits 22B in an area toward the right side of it from where it is retained in guide hole 25A. These slits 22B are formed in parallel to the axis of shaft 22, in a length generally equal to that of plane 23B, and at regular angles over the periphery of shaft 22. An end face of shaft 22 at the side where slits 22B are formed is located at the outer side of planes 23B and 23D. Also, another end face at the left side of shaft 22 is arranged so that it exposes planes 23A and 23C.

Fixing slot 24H provided at holder 24 has a matching shape with the left end of shaft 23, and it holds shaft 23 so as not rotatable when engaged with the left end of shaft 23.

Figure 4:
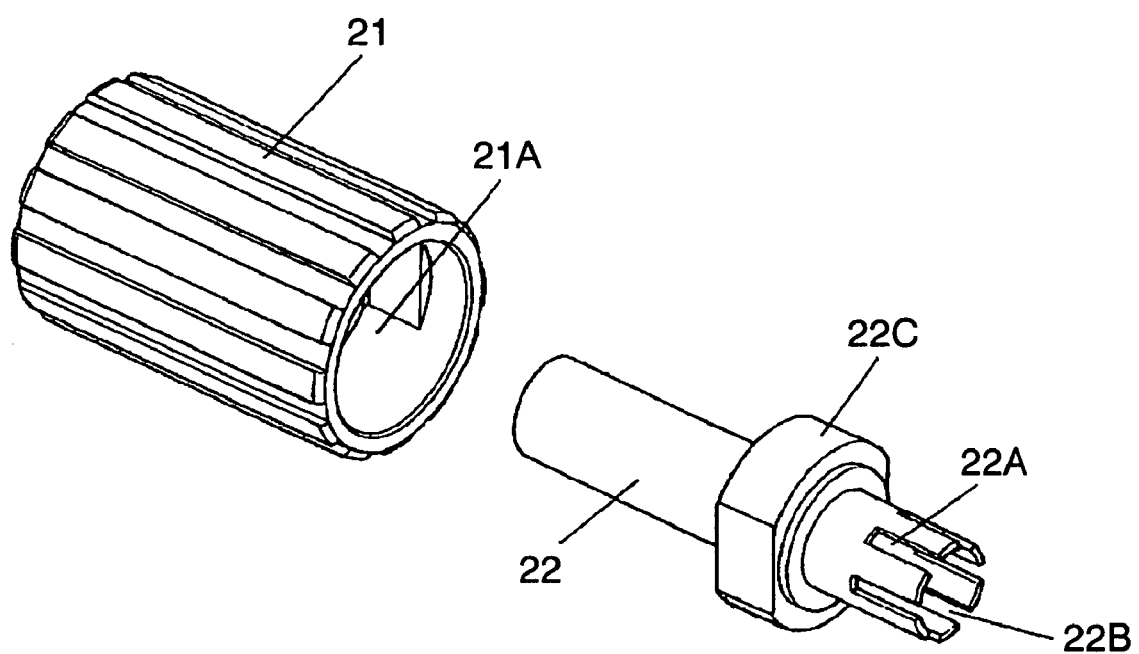
FIG. 4 is an exploded perspective view of a roller and an inner shaft used for the rotary encoder of FIG. 1.

Referring now to FIG. 4, description is provided of a relation between roller 21 and shaft 22 shown as a united structure.

Shaft 22 of a collared tubular shape has collar 22C of generally a parallel-sided circular shape in the middle part of the outer periphery, as shown in FIG. 4. On the other hand, roller 21 is provided with a recess of parallel-sided circular shape corresponding to collar 22C in a portion of larger diameter at the right side of center hole 21A. Collar 22C is press-fitted securely in this recess to unite roller 21 and shaft 22 into a single component without leaving any plays between them in a direction of rotation.

Roller 21 and shaft 22 united into one body are held rotatably around shaft 23 inserted in through hole 22A, which serves as a stationary axle.

Description is provided next of structures of holders 24 and 25.

As shown in FIG. 1 and FIG. 3, holder 24 has guide hole 24A for receiving and retaining shaft 22 and hollow part 24B having an open bottom. In addition, holder 24 is provided with round bar-shaped arm 24C (hereinafter referred to as "arm 24C") at the front side of hollow part 24B in the center, and square bar-shaped arm 24D (hereinafter referred to as "arm 24D") at the back side of hollow part 24B, wherein the both arms extend in parallel to shaft 22. Holder 24 is thus formed in the shape of generally the letter U when viewed from the above. Arm 24C is provided at its tip end with coupling protrusion 24E (hereinafter referred to as "protrusion 24E"). Arm 24D is provided at both ends thereof with coupling protrusions 24F and 24G (hereinafter referred to as "protrusions 24F and 24G") having a parallel-sided circular shape in cross section.

Holder 25 has guide hole 25A for receiving and retaining shaft 22. Holder 25 has hollow part 25B having an open bottom, too. Holder 25 is provided with round bar-shaped arm 25C (hereinafter referred to as "arm 25C") extending in parallel to shaft 22 at the front side of hollow part 25B in the center. Arm 25C is provided with a coupling hole (not shown) in its tip end. Holder 25 is also provided with through hole 25D at the back side. Through hole 25D serves as a retainer of protrusion 24G, such that protrusion 24G is inserted to protrude there through.

Holders 24 and 25 hold shaft 22 united with roller 21 in a rotatable manner inside guide holes 24A and 25A. In addition, fixing slot 24H securely retains the left end of shaft 23. Furthermore, protrusion 24E is press-fitted into the coupling hole in holder 25, and protrusion 24G is inserted in through hole 25D, to complete block 20.

Figure 5:
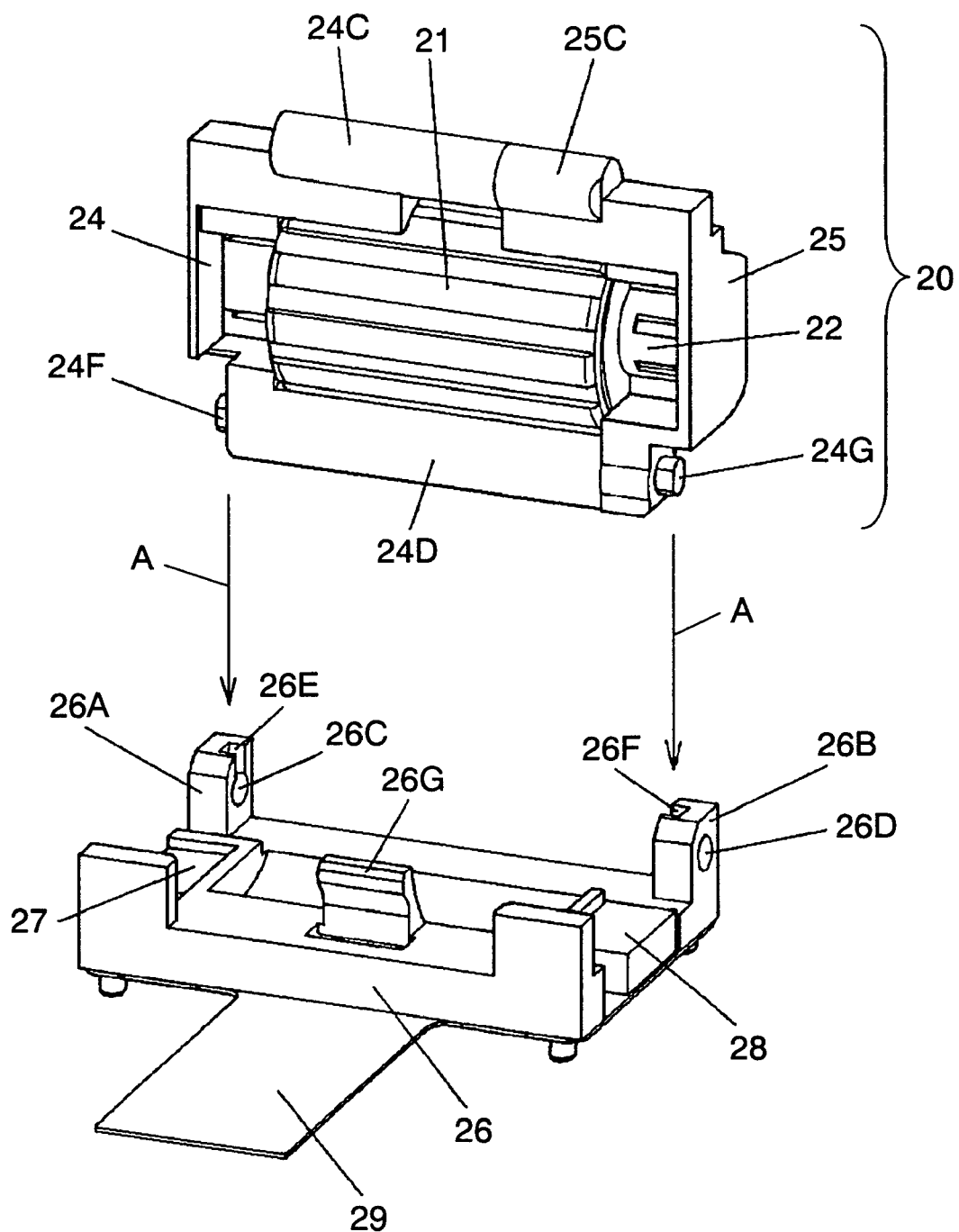
FIG. 5 is an exterior view illustrating a method of assembling the rotary encoder of FIG. 1.

On the other hand, mount 26 is provided with support sections 26A and 26B projecting from two side corners of the back side, as shown in FIG. 5. Support sections 26A and 26B have support holes 26C and 26D in a diameter to fit for the circular portions of the parallel-sided circular protrusions 24F and 24G respectively. In addition, support sections 26A and 26B have insert grooves 26E and 26F (hereinafter referred to as "grooves 26E and 26F") formed above support holes 26C and 26D. Here, a width of grooves 26E and 26F is sized to match with a width of the parallel-sided portions of the respective protrusions 24F and 24G.

Mount 26 is provided with elastic protrusion 26G (hereinafter referred to as "protrusion 26G") at the center of the front side corresponding to arms 24C and 25C. Protrusion 26G protrudes forward at the upper end, and serves as a stopper for retaining arms 24C and 25C.

When block 20 is assembled to mount 26, it is tilted in a manner that the side of arm 24D faces downward as shown in FIG. 5. Protrusions 24F and 24G are then inserted in corresponding grooves 26E and 26F as shown by arrows A in FIG. 5. Since grooves 26E and 26F have the width to match with the width of protrusions 24F and 24G, these protrusions 24F and 24G are smoothly slid down into support holes 26C and 26D.

Figure 6:
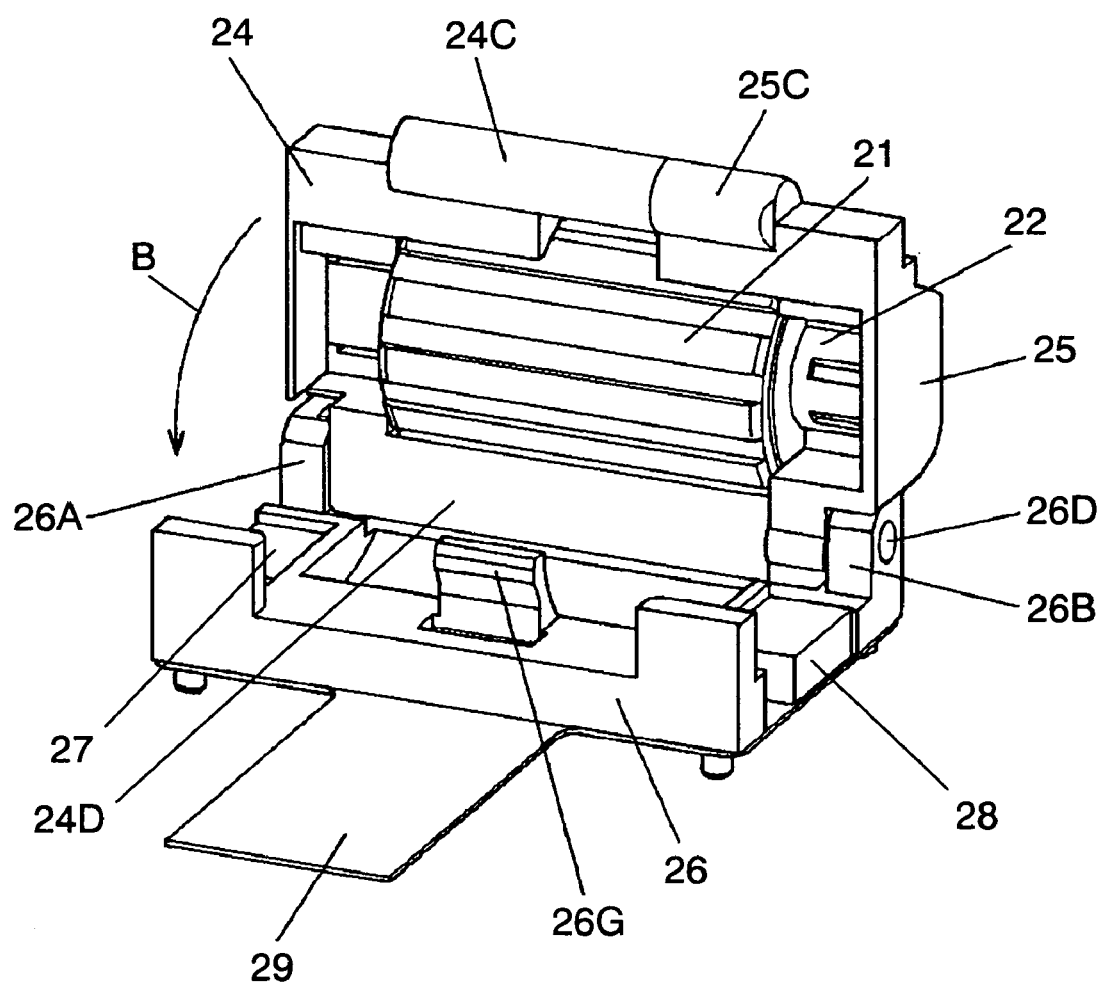
FIG. 6 is another exterior view also illustrating the method of assembling the rotary encoder of FIG. 1.

Next, block 20 is turned about support holes 26C and 26D in a direction indicated by arrow B as shown in FIG. 6. This brings arms 24C and 25C downward while elastically deforming protrusion 26G into a position where the middle part of arms 24C and 25C is in elastic contact with and retained by a hook portion at the top end of protrusion 26G, and completes the assembly as shown in FIG. 2.

In this state of complete assembly, protrusions 24F and 24G never slip out of support sections 26A and 26B because the width of grooves 26E and 26F is only of a dimension nearly equal to the width of the parallel-sided protrusions 24F and 24G.

In this state of complete assembly, light-emitting device 27 and light-detecting device 28 are in their respective positions confronting planes 23A and 23B across the spaces in hollow parts 24B and 25B.

The rotary encoder is constructed as described above. When a force of manipulation is applied to the outer periphery of roller 21 in the tangential direction, shaft 22 united with roller 21 rotates. However, shaft 23 inserted in shaft 22 does not rotate even when shaft 22 rotates because shaft 23 is fixed to holder 24.

When light-emitting device 27 emits light while roller 21 is being rotated, the light traveling upward (shown in FIG. 1 by a double-dashed chain line with arrow C) passes through plane 23A confronting hollow part 24B. The light then travels upward in shaft 23, it is reflected off plane 23C, and advances along a direction of the axis of shaft 23.

The light advancing through the axis of shaft 23 is reflected again off plane 23D to the downward direction, and passes through plane 23B to the outside of shaft 23. The light came out of shaft 23 reaches light-detecting device 28. Light-detecting device 28 thus receives the light, and outputs an electrical signal (not shown).

Here, shaft 22 united with roller 21 is being rotated about shaft 23. Therefore, the plurality of slits 22B let the light traveled through plane 23B pass and block intermittently in synchronization with the rotation of roller 21. As a result, light-detecting device 28 outputs electrical signals (i.e., pulse signals) in synchronization with the rotation of roller 21, while roller 21 continues its rotation.

Furthermore, the electrical signals output by light-detecting device 28 consist of two phases of signals since light-detecting device 28 includes a combination of two light-detecting elements. In other words, the encoder provided here functions as an incremental rotary encoder.

As described above, shaft 22 fixed unitary to roller 21 rotates when roller 21 is rotated. Slits 22B provided at the side above light-detecting device 28 thus let the light generated by light-emitting device 27 and traveled inside shaft 23 pass and block periodically. As the result, light-detecting device 28 receives the light, and outputs periodical pulse signals.

In other words, the rotary encoder has a structure not provided with any sliding contact to wear out for generating pulse signals, thereby realizing a long operational life. Moreover, this structure can reduce the overall dimensions because it makes effective use of the one end of the rotatably retained shaft 22 and the both ends of shaft 23 inserted in the shaft 22.

Figure 7:
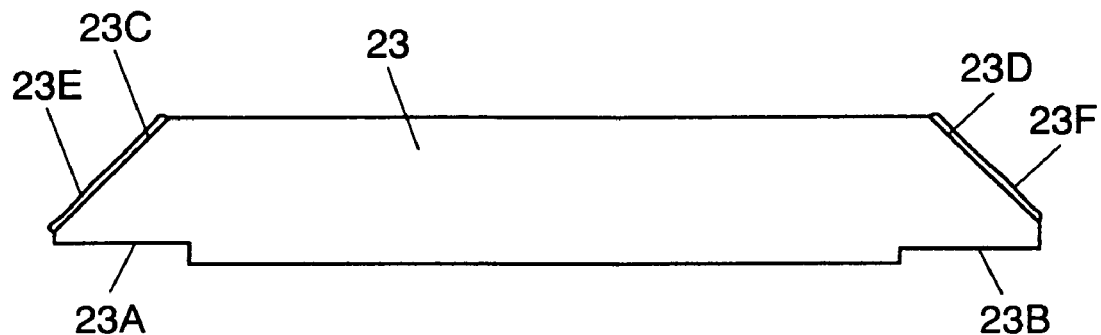
FIG. 7 is a longitudinal sectional view showing one configuration of a light guide shaft adoptable for the rotary encoder of FIG. 1.

The light entered in shaft 23 can be reflected efficiently when the outside surfaces of planes 23C and 23D are provided with reflection membranes 23E and 23F formed of aluminum films by vapor deposition or the like method, as shown in FIG. 7. This structure stabilizes output of the electrical signals because of an increase in strength of the light received by light-detecting device 28.

Figure 8:
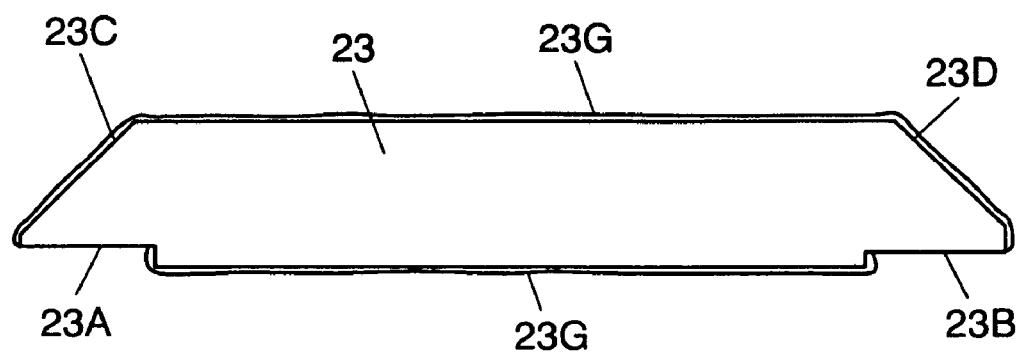
FIG. 8 is a longitudinal sectional view showing another configuration of the light guide shaft adoptable for the rotary encoder of FIG. 1.

Alternatively, reflection membrane 23G may be formed not only on planes 23C and 23D but also on the entire surface of shaft 23, except for planes 23A and 23B, as shown in FIG. 8. Reflection membrane 23G reduces diffusion of the light traveling inside shaft 23, and guides the light more efficiently to light-detecting device 28. As a result, it further improves steadiness of generating output of the electrical signals.

Figure 9:
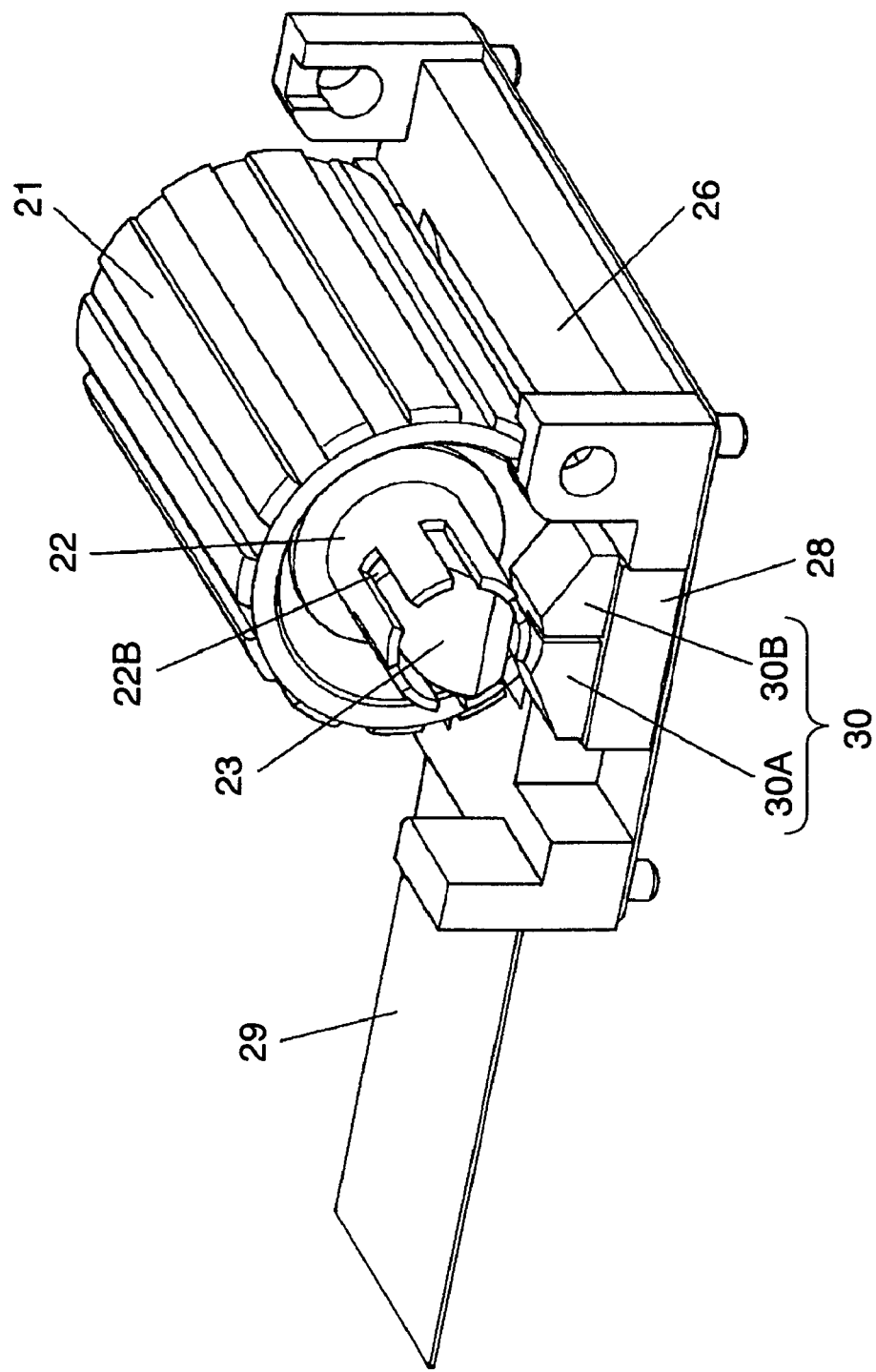
FIG. 9 is a partially disassembled exterior view showing another mode of the rotary encoder of FIG. 1.

FIG. 9 is a partially disassembled exterior view of the encoder in which holders 24 and 25 are removed. As shown in FIG. 9, light guides 30A and 30B (hereinafter referred to as "guides 30A and 30B") may be provided above light-detecting device 28. These guides 30A and 30B are disposed between light-detecting device 28 and slits 22B, and they constitute a light guide pair 30. Guides 30A and 30B form a shape of generally trapezoid when viewed from the side, and they are transparent as are made of a transparent material. The bottom surfaces of guides 30A and 30B cover upper surfaces of individual elements of light-detecting device 28. The upper surfaces of guides 30A and 30B are formed into curved surfaces having a certain curvature, and they face an outer periphery of shaft 22 where slits 22B are formed with a narrow space.

Because of guides 30A and 30B provided here, the light passed through slits 22B enters insides of guides 30A and 30B from their curved upper surfaces. The light then travels directly to light-detecting device 28 through the bottom surfaces of guides 30A and 30B. This structure can therefore reduce a loss of optical intensity attributable to diffusion of the light in the space of hollow part 25B, and guide the light efficiently to light-detecting device 28.

Each of guides 30A and 30B is provided with a reflection membrane formed of an aluminum film on the exterior, except for the upper surface and the bottom surface. Reflection membranes prevent the light traveling in guides 30A and 30B from diffusing outside of them, so as to guide the light more efficiently toward light-detecting device 28. However, the reflection membranes formed on the exterior surfaces of guides 30A and 30B are not indispensable. The function of guides 30A and 30B for guiding the light to light-detecting device 28 can be fulfilled even if the reflection membranes are not provided.

Figure 10:
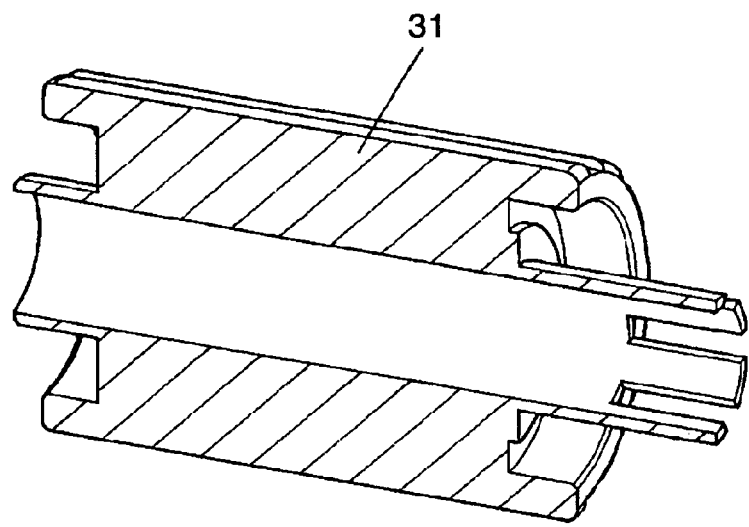
FIG. 10 is a sectioned perspective view showing another configuration of a rotary body adoptable for the rotary encoder of FIG. 1.

Moreover, rotary body 31 of an integrated component shown in FIG. 10 may be used instead of uniting roller 21 and shaft 22. Rotary body 31 can be made of an insulation resin, for instance, by using a technique of integration forming such as injection molding. Since this reduces a number of parts to compose the encoder, it decreases the manufacturing cost and provides the rotary encoder less expensively.

Figure 11:
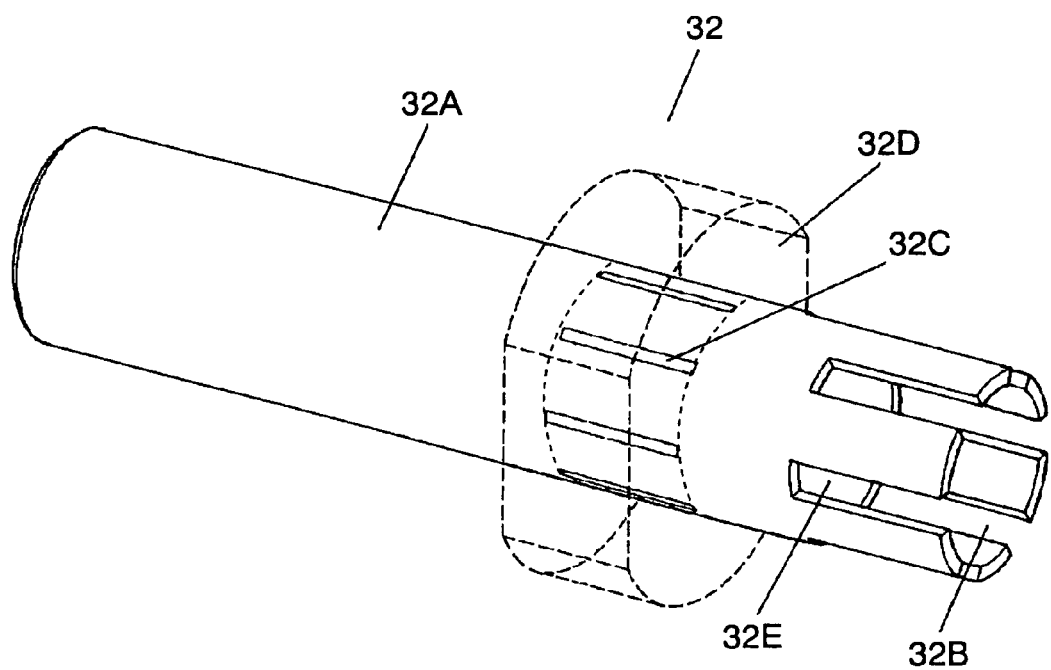
FIG. 11 is an exterior view showing another configuration of an inner shaft adoptable for the rotary encoder of FIG. 1.

Furthermore, the rotary encoder may employ inner shaft 32 (hereinafter referred to as "shaft 32"), which has hollow shaft 32A (hereinafter referred to as "shaft 32A") made of a metallic pipe of aluminum, stainless steel or the like provided with slits 32B at one end thereof, as shown in FIG. 11. Shaft 32A has grooves 32C for preventing slipping around a portion where collar 32D (shown by a dotted line in FIG. 11) is attached. Shaft 32A also has slits 32B and through hole 32E. Shaft 32A undergoes a process of outsert molding of an insulation resin to form collar 32D of generally a parallel-sided circular shape, to become complete shaft 32. Shaft 32 produced in this manner easily improves dimensional accuracy of through hole 32E having a circular cross-section, as compared to shaft 22 made of molded insulation resin. This can thus improve operational feeling when making rotary manipulation of roller 21.

In the above embodiment, although light-detecting device 28 has been shown as being located at the side where slits 22B are provided, the location may be changed so that light-emitting element 27 is disposed to this side. However, various forms of scattering occur of the light emitted by light-emitting device 27 before being received by light-detecting device 28. Therefore, the effect of slits 22B to intermittently pass and block the light is higher when light-detecting device 28 is placed immediately after slits 22B. The stability of electrical signals output by light-detecting device 28 thus becomes better.

Moreover, although light-detecting device 28 has been illustrated as being a combination of two elements, it can be a single element. However, the use of light-detecting device 28 of two elements gives two phases of electrical signals, and thereby providing the electrical signals of higher reliability.

Second Embodiment

Figure 12:
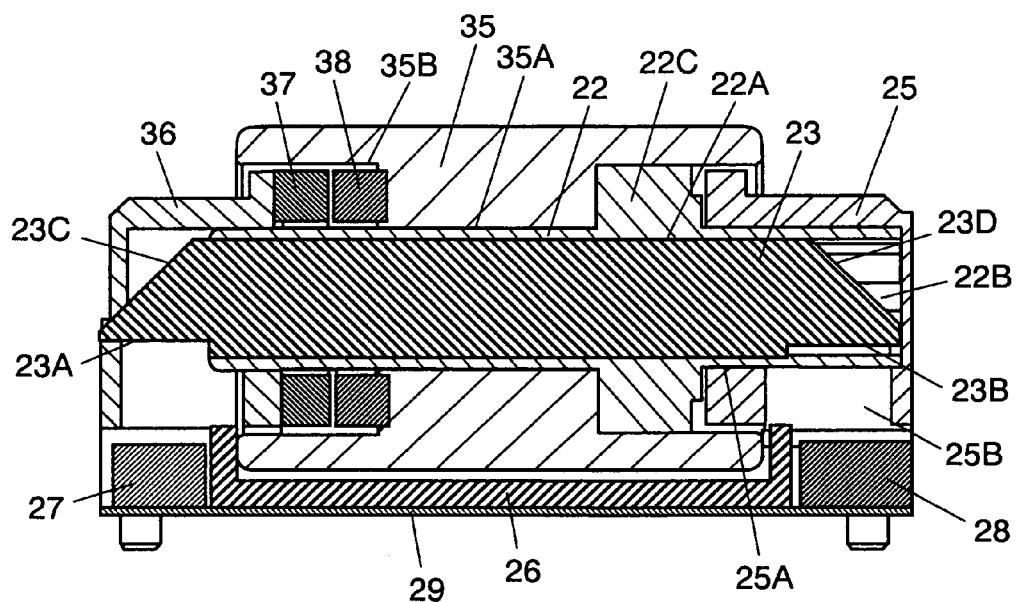
FIG. 12 is a sectional view of a rotary encoder according to a second embodiment of the present invention.
Figure 13:
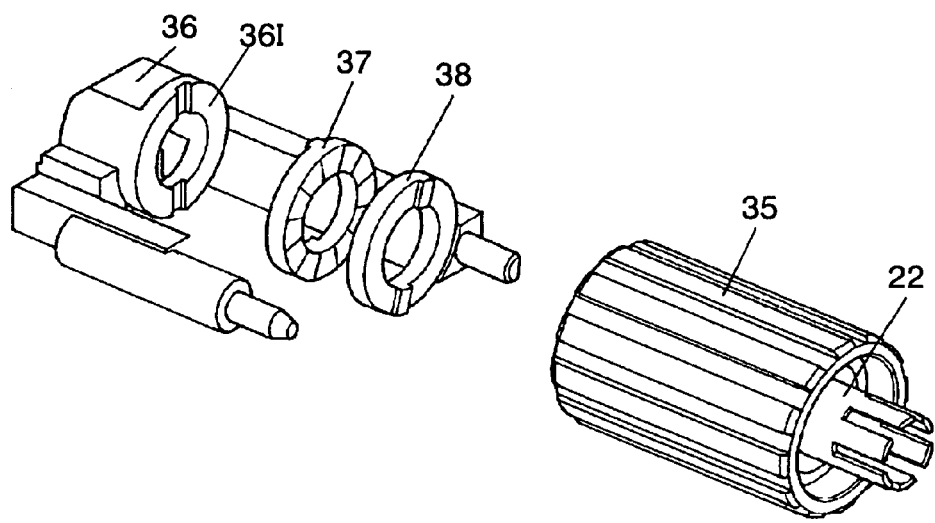
FIG. 13 is an exploded perspective view showing a principal portion of the rotary encoder of FIG. 12.

FIG. 12 is a sectional view of a rotary encoder (hereinafter referred to as "encoder") according to the second embodiment. FIG. 13 is an exploded perspective view showing a principal portion of the rotary encoder of FIG. 12. Like reference numerals are used to designate like components as those of the first embodiment, and their details will be omitted.

In FIG. 12 and FIG. 13, inner shaft 22 having through hole 22A of a circular cross section is inserted in center hole 35A provided in roller 35 made of an insulation resin, and fixed together into one component. Roller 35 and shaft 22 are inserted and fixed together in the same manner as the first embodiment.

Shaft 23 is inserted in through hole 22A. Shaft 22 is rotatably supported at its peripheries near the both ends by first holder 36 (hereinafter referred to as "holder 36") on the left side and second holder 25 (hereinafter referred to as "holder 25") on the right side. A combination of roller 35, shaft 22, shaft 23, and holders 36 and 25 compose one sub-assembly component block (hereinafter referred to as "block"). Shafts 22 and 23, and holder 25 are analogous to those of the first embodiment.

In addition, structures of mount 26, substrate 29, light-emitting device 27 and light-detecting device 28 are also analogous to those of the first embodiment.

There is hollow space 35B of large diameter in center hole 35A at a location corresponding to the left side holder 36, and a click mechanism for generating a tactile click is assembled inside hollow space 35B.

The click mechanism has first magnet plate 37 (hereinafter referred to as "magnet 37") and second magnet plate 38 (hereinafter referred to as "magnet 38"). Both magnets 37 and 38 are annularly shaped, and their peripheries are magnetized alternately with south poles and north poles. Magnet 37 is fixed to end face 36I of holder 36 with adhesive or the like means, and incorporated with holder 36. Magnet 38 is also fixed with adhesive or the like means to either an end wall or a side wall of hollow space 35B. Magnets 37 and 38 are thus positioned in a manner that their side faces confront each other with a small clearance.

The rotary encoder constructed as above outputs an electrical signal of a prescribed form when roller 35 is rotated with a force applied to the tangential direction of its outer periphery. At the same time with the rotation of roller 35, magnet 38 also rotates relative to magnet 37. This generates an attractive force and a repulsive force alternately and repeatedly by the south poles and the north poles formed on the peripheries of magnets 37 and 38. The attractive force and the repulsive force of the magnets produce tactile clicks.

That is, when roller 35 is rotated, the rotary encoder produces light and smooth tactile clicks by the relative rotation between magnets 37 and 38, at the same time it generates an electrical signal of pulse waveform from light-detecting device 28 that receives the light. Since the click mechanism has no mechanically sliding component, it can last nearly permanently. The encoder provided here is thus considered as having the click mechanism of a long operational life.

Third Embodiment

Figure 14:
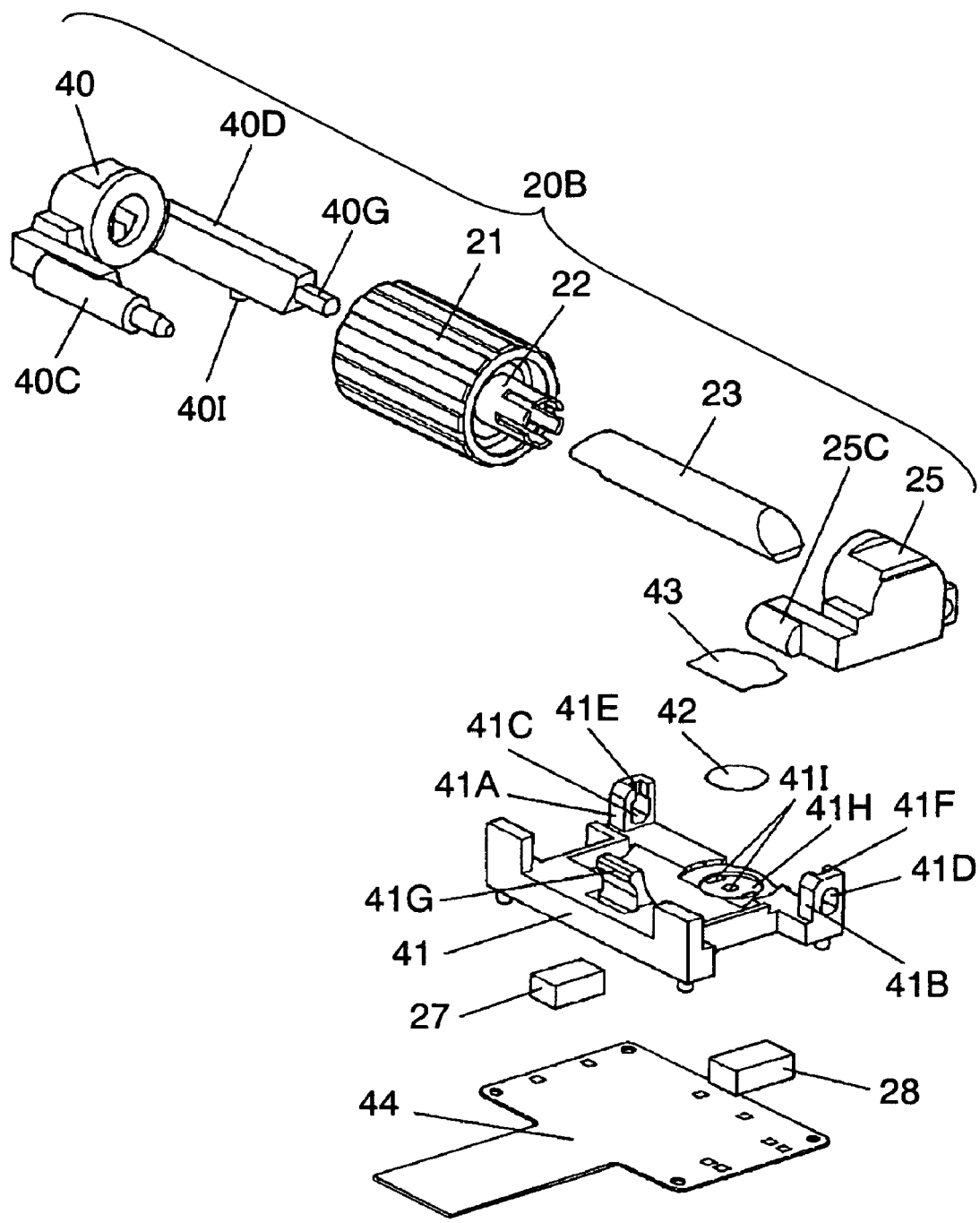
FIG. 14 is an exploded perspective view of a rotary encoder according to a third embodiment.
Figure 15:
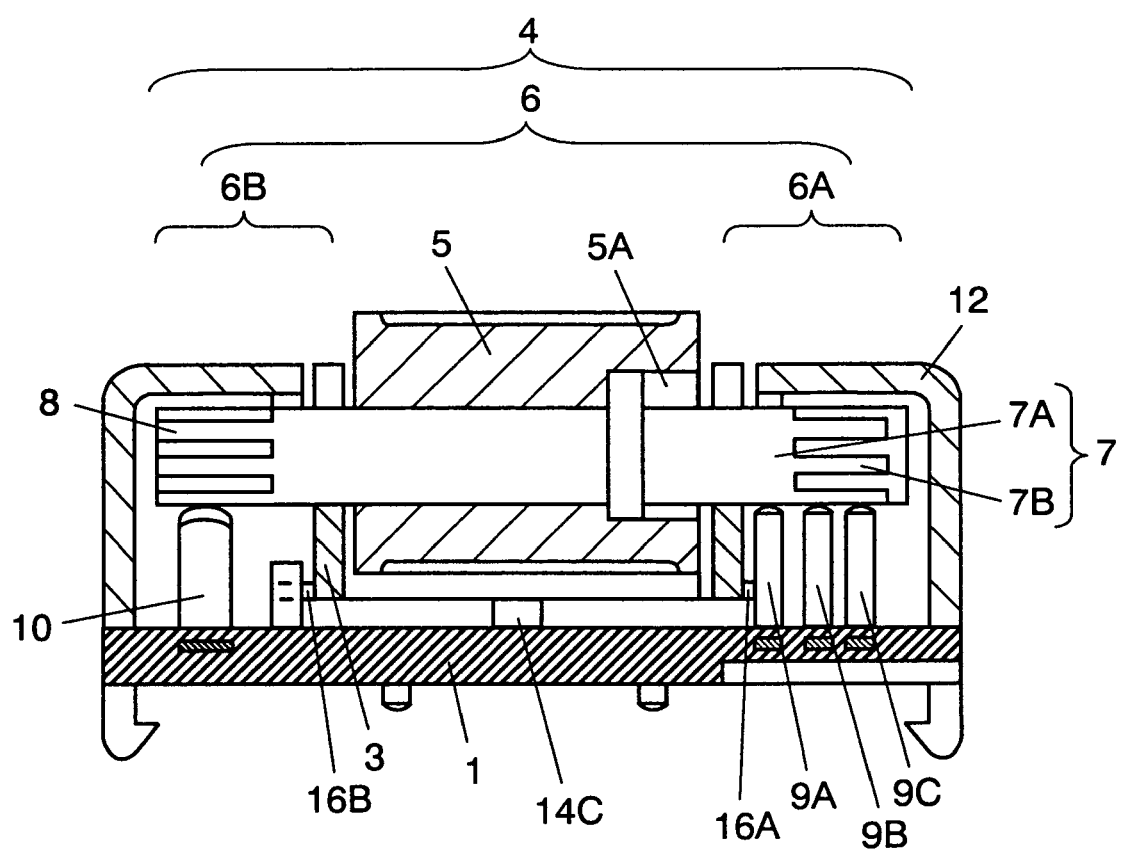
FIG. 15 is a sectional view of a rotary encoder of the prior art.
Figure 16:
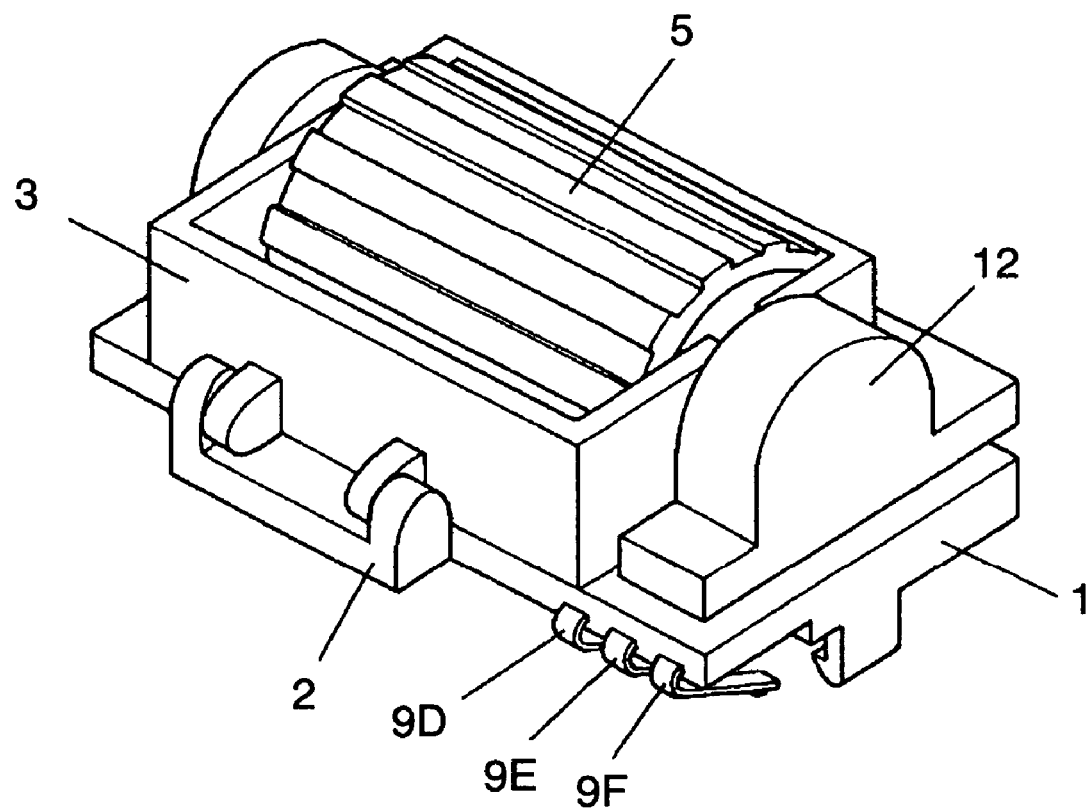
FIG. 16 is a general exterior view of the rotary encoder of FIG. 15.
Figure 17:
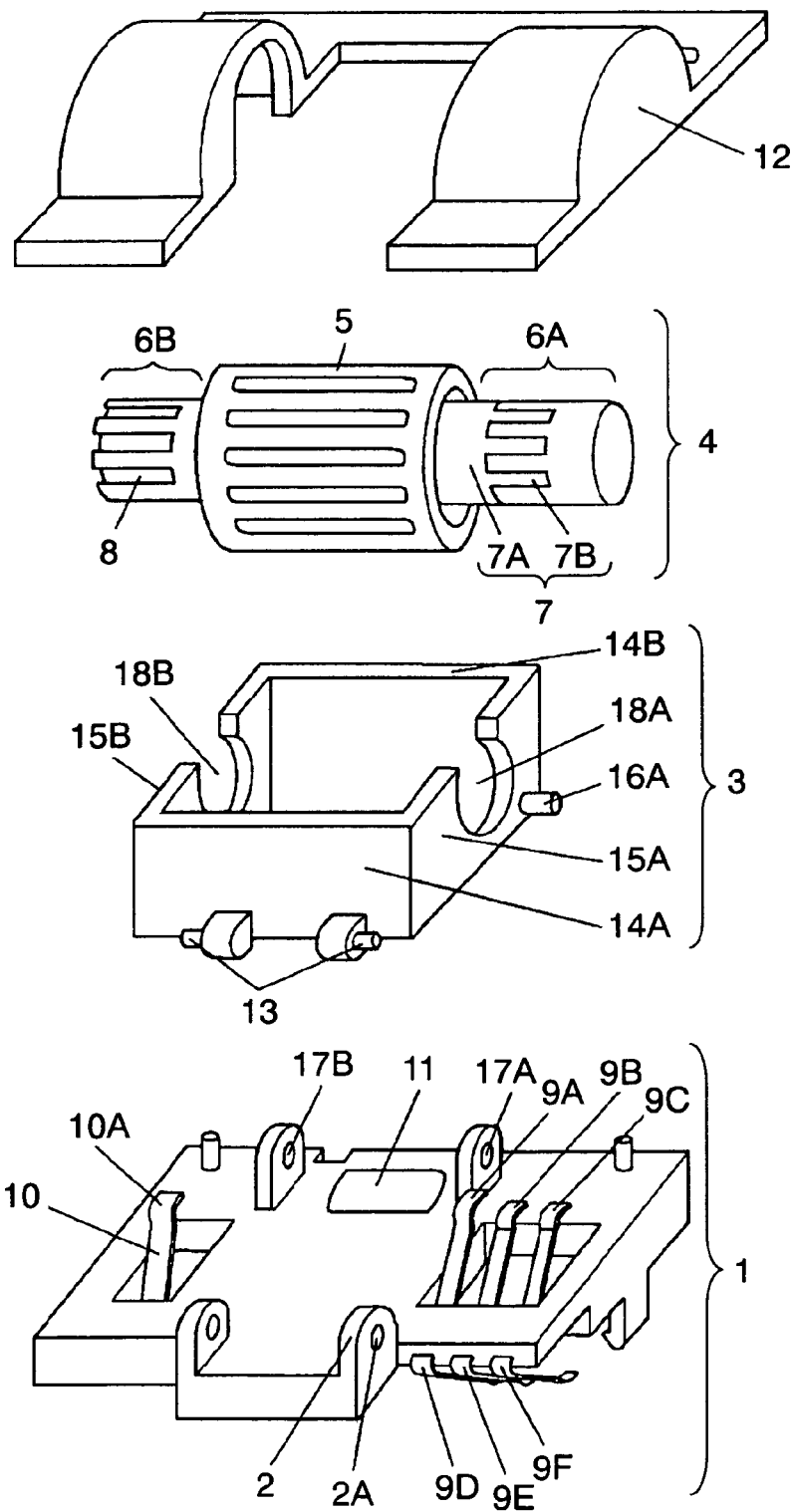
FIG. 17 is an exploded perspective view of the rotary encoder of FIG. 15.

FIG. 14 is an exploded perspective view of a rotary encoder (hereinafter referred to as "encoder") according to the third embodiment. Like reference numerals are used to designate like components as those of the first and the second embodiments, and their details will be omitted.

The encoder discussed in the third embodiment has a push switch, as shown in FIG. 14.

First holder 40 (hereinafter referred to as "holder 40") is provided with depressing boss 40I (hereinafter referred to as "boss 40I") on the bottom side at the center of square bar-shaped arm 40D (hereinafter referred to as "arm 40D"). Holder 40 has similar shape as holder 24, except that it is provided with boss 40I.

Furthermore, there is recess 41H for a switch provided in mount 41 at a location corresponding to boss 40I. A plurality of stationary contacts 41I (hereinafter referred to as "contacts 41I") are mounted to the bottom surface of recess 41H by insertion molding or the like method. Dome-shaped movable contact 42 (hereinafter referred to as "contact 42") is placed upward in recess 41H. Flexible film 43 (hereinafter referred to as "film 43") is then placed over contact 42 in a manner to cover it, to complete the push switch.

Arm 40D is provided at both ends thereof with coupling protrusions 40G (hereinafter referred to as "protrusions 40G") having a parallel-sided circular shape in a projecting manner. Furthermore, mount 41 is provided with support sections 41A and 41B, and insert grooves 41E and 41F (hereinafter referred to as "grooves 41E and 41F") formed in the upper parts of support sections 41A and 41B. Protrusions 40G are inserted in grooves 41E and 41F. All of protrusions 40G, support sections 41A and 41B, and grooves 41E and 41F have same configurations as those of the first embodiment.

There are oval holes 41C and 41D (hereinafter referred to as "holes 41C and 41D") provided below support sections 41A and 41B. These holes 41C and 41D have generally a parallel-sided oval shape elongated vertically in a width to match a diameter of the circular protrusions 40G. Round bar-shaped arm 40C (hereinafter referred to as "arm 40C") provided on holder 40 is connected with round bar-shaped arm 25C provided on holder 25. Besides, arms 40C and 25C are retained in elastic contact with elastic protrusion 41G (hereinafter referred to as "protrusion 41G") provided on mount 41. Hence, sub-assembly component block 20B (hereinafter referred to as "block 20B") is retained turnably about arms 40C and 25C up to an extent provided by holes 41C and 41D.

Here, block 20B is retained in a state of being thrust upward by a resilient force of contact 42 applied to boss 40I. Structures of the other components are analogous to those of the first and the second embodiments described above.

Contacts 41I are electrically connected to terminals for external connection (not shown). The terminals are disposed to the underside surface of mount 41, and they are electrically in continuity with mounting substrate 44.

When roller 21 is depressed, in the above structure, block 20B turns to move boss 40I downward. Boss 40I pushes down contact 42 through film 43, and resiliently deforms contact 42 while yielding a tactile response. This makes electrical contact among the plurality of contacts 41I to turn on the switch.

When roller 21 is freed from being pressed, on the other hand, contact 42 restores its original shape by its own resilient restoring force. This turns off the switch, and pushes up boss 40I. At the same time, contact 42 thrusts block 20B upward to the original state when protrusions 40G come into abutment on upper ends in holes 41C and 41D.

What is claimed is:

1. A rotary encoder comprising:
   a roller of substantially cylindrical shape having a center hole;
   a tubular inner shaft inserted in and connected to the center hole, the inner shaft having a slit formed at one end along a direction parallel to the axis thereof;
   a translucent cylindrical light guide shaft inserted in the inner shaft in a manner that one end is surrounded by the slit, the light guide shaft having:
      a first plane formed at a lower side at one end and in parallel to the axis thereof;
      a second plane formed at a lower side at the other end in parallel to the axis;
      a first inclined plane formed above the first plane at an angle of 45 degrees to the axis; and
      a second inclined plane formed above the second plane at an angle of 45 degrees to the axis and substantially orthogonal to the first inclined plane;
   a pair of holders securely holding one end of the light guide shaft, and supporting the roller in a rotatable manner through the inner shaft;
   a light-detecting device disposed under one end of the light guide shaft; and
   a light-emitting device disposed under the other end of the light guide shaft, wherein
   light emitted by the light-emitting device enters the light guide shaft at the first plane, is reflected off the first inclined plane and the second inclined plane, led to an outside of the light guide shaft through the second plane, and detected by the light-detecting device when it passes through the slit.

2. The rotary encoder of claim 1 further comprising:
   a light guide between the slit and the light-detecting device.

3. The rotary encoder of claim 2,
   wherein the light guide is provided with a reflection membrane formed of an aluminum film on an exterior surface thereof.

4. The rotary encoder of claim 1,
   wherein any of the first inclined plane and the second inclined plane is provided with a reflection membrane formed of an aluminum film on a surface thereof.

5. The rotary encoder of claim 1,
   wherein the inner shaft and the roller are integrally formed of an insulation resin.

6. The rotary encoder of claim 1,
   wherein the inner shaft includes:
      a hollow shaft made of a metallic pipe; and
      a collar formed by outsert molding using a resin around the hollow shaft.

7. The rotary encoder of claim 1 further comprising:
   a first magnet plate having a south pole and a north pole formed alternately along a periphery thereof, and fixed to an end of the roller; and
   a second magnet plate having a south pole and a north pole formed alternately along a periphery thereof, and incorporated with the holder, wherein
   the first magnet plate and the second magnet plate are closely confronted with each other, and generate an attractive force and a repulsive force alternately with rotation of the roller.

* * * * *